US011938609B2

(12) United States Patent
Wang et al.

(10) Patent No.: US 11,938,609 B2
(45) Date of Patent: Mar. 26, 2024

(54) ELECTRIC CIRCULAR SAW

(71) Applicant: Nanjing Chervon Industry Co., Ltd., Nanjing (CN)

(72) Inventors: Shaojun Wang, Nanjing (CN); Rong Wang, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 351 days.

(21) Appl. No.: 17/406,129

(22) Filed: Aug. 19, 2021

(65) Prior Publication Data

US 2022/0063082 A1 Mar. 3, 2022

(30) Foreign Application Priority Data

Aug. 25, 2020 (CN) ......................... 202010866309.4

(51) Int. Cl.
*B25F 5/02* (2006.01)
*B27G 19/04* (2006.01)

(52) U.S. Cl.
CPC ................ *B25F 5/02* (2013.01); *B27G 19/04* (2013.01)

(58) Field of Classification Search
CPC .................................. B25F 5/02; B27G 19/04
USPC ............................................................ 30/374
See application file for complete search history.

(56) References Cited

U.S. PATENT DOCUMENTS

| | | | | |
|---|---|---|---|---|
| 6,055,734 A * | 5/2000 | McCurry | B27B 9/00 83/520 |
| 6,301,789 B1 * | 10/2001 | Zeiler | B27B 9/00 30/388 |
| 6,543,143 B2 * | 4/2003 | Moore | B27B 9/00 83/478 |
| D502,074 S * | 2/2005 | Sham | D8/66 |
| 8,272,133 B2 * | 9/2012 | Wascow | B27B 9/02 30/376 |

FOREIGN PATENT DOCUMENTS

CN 203636085 U 6/2014

* cited by examiner

*Primary Examiner* — Omar Flores Sanchez
(74) *Attorney, Agent, or Firm* — Greenberg Traurig, LLP

(57) ABSTRACT

An electric circular saw includes a base, a saw blade, a body and a shield. The shield includes a fixed shield, the fixed shield is provided with a window for a user's line of sight to view the saw blade. The body includes a main handle and an auxiliary handle, the auxiliary handle is disposed on a front side of the main handle, the window has an upper extreme position farther from the base, and a cutting point of the saw blade on a product is defined as a position of saw tip, a straight line passes through the upper extreme position of the window and the position of saw tip is defined as a visible line, and the auxiliary handle is configured to deviate from the visible line.

14 Claims, 5 Drawing Sheets

ELECTRIC CIRCULAR SAW

RELATED APPLICATION INFORMATION

This application claims the benefit under 35 U.S.C. § 119(a) of Chinese Patent Application No. CN 202010866309.4, filed on Aug. 25, 2020, which is incorporated by reference in its entirety herein.

BACKGROUND

An electric circular saw is an electric cutting tool, and an operator holds the electric circular saw by hand to cut a product to be machined. The electric circular saw generally includes a casing, a base connected to the casing, a saw blade installed in the casing, a power mechanism installed in the casing, and a handle installed on an outer surface of the casing. The bottom of the saw blade is lower than the base.

When the product is cut, a bottom surface of the base adheres to a top surface of the product to be machined, the power mechanism drives the saw blade to rotate, and the operator cuts the product along a preset route. During cutting, the operator needs to observe the cutting position between the saw blade and the product to ensure that the product is cut accurately along the preset route.

To improve safety, the casing further includes a shield that covers the saw blade. After the shield is added, the shield is provided with a window so that the operator can observe the position between the saw blade and the product without being affected by the shield.

Electric circular saws are divided into a single-handle type and a double-handle type. For the double-handle electric circular saw, the operator generally holds a main handle with one hand and an auxiliary handle with the other hand to cut the product. The auxiliary handle can improve the smoothness of cutting and bring the comfort of cutting to the operator. However, the existing auxiliary handle might block the line of sight of the operator, making it difficult for the operator to observe the position between the saw blade and the product, which easily causes an actual cutting route to deviate from the preset route and reduces the accuracy of cutting the product.

SUMMARY

An electric circular saw includes: a base including a saw blade slot; a body including a casing and a drive mechanism disposed in the casing; a saw blade driven to rotate about a first axis by the drive mechanism, wherein the saw blade is disposed in the saw blade slot along a front-and-back direction; and a shield disposed on an outer circumference of the saw blade. The shield includes a fixed shield, the fixed shield includes a first sidewall, a second sidewall and a connecting wall, the first sidewall disposed on the side of the saw blade close to the drive mechanism, the second sidewall is disposed on the side of the saw blade away from the drive mechanism, the connecting wall connects the first sidewall and the second sidewall, and the first sidewall is provided with a window for a user's line of sight to view the saw blade. The body includes a main handle and an auxiliary handle, the auxiliary handle is disposed on a front side of the main handle, the window has an upper extreme position farther from the base, and a cutting point of the saw blade on a product is defined as a position of saw tip, a straight line passes through the upper extreme position of the window and the position of saw tip is defined as a visible line, and the auxiliary handle is configured to deviate from the visible line.

In an example, the auxiliary handle is disposed on the lower side of the visible line.

In an example, a ratio of a distance H2 between an upper extreme position of the auxiliary handle and a bottom surface of the base to a distance H1 between the upper extreme position of the window and the bottom surface of the base is greater than or equal to 1 and less than or equal to 2.5.

In an example, a ratio of an axial distance L2 between an inner end surface of the auxiliary handle facing towards the saw blade and the saw blade to an axial distance L1 between the window and the saw blade is greater than or equal to 2.

In an example, a distance L2 between an inner end surface of the auxiliary handle facing towards the saw blade and the saw blade is greater than a distance L5 between an end surface of the main handle facing towards the saw blade and the saw blade.

In an example, the main handle has a first central surface, the main handle is arranged substantially symmetrically about the first central surface, the auxiliary handle includes a holding portion and a connection portion, the connection portion connects the holding portion and the main handle, the connection portion has a second central surface, at least a portion of the connection portion is symmetrically about the second central surface, an axial distance L4 between the first central surface of the main handle and the saw blade is smaller than a distance L3 between the second central surface of the auxiliary handle and the saw blade.

In an example, a projection of the visible line in a plane perpendicular to the saw blade is defined as a first projection line, the auxiliary handle includes a nearest point closest to the first projection line, a projection of a straight line passing through the position of saw tip and the nearest point is defined as a second projection line, an angle between the first projection line and the second projection line is a visible angle b, and the visible angle b is greater than zero degrees.

In an example, the visible angle b is greater than or equal to 3 degrees and less than or equal to 10 degrees.

In an example, the visible angle b is greater than 5 degrees.

In an example, the main handle has a first central surface, the main handle is arranged substantially symmetrically about the first central surface, the size of a part of the auxiliary handle located on the left side of the first central surface in the first axis is larger than the size of a part of the auxiliary handle located on the right side of the first central surface in the first axis.

An electric circular saw includes: a base including a saw blade slot; a body including a casing and a drive mechanism disposed in the casing; a saw blade driven to rotate about a first axis by the drive mechanism, wherein the saw blade is disposed in the saw blade slot along a front-and-back direction; and a shield disposed on an outer circumference of the saw blade. The shield includes a fixed shield connected to the casing, the fixed shield includes a first sidewall, a second sidewall and a connecting wall, the first sidewall disposed on the side of the saw blade close to the drive mechanism, the second sidewall is disposed on the side of the saw blade away from the drive mechanism, and the connecting wall connects the first sidewall and the second sidewall, the first sidewall is provided with a window for a user's line of sight to view the saw blade. The body includes a main handle and an auxiliary handle, the auxiliary handle is disposed on a front side of the main handle, the window has an upper extreme position farther from the base, and a cutting point of the saw blade on a product is defined as a position of saw tip, a straight line passes through the upper extreme position of the window and the position of saw tip is defined as a visible line, and the auxiliary handle is disposed on the lower side of the visible line.

In an example, a ratio of a distance H2 between an upper extreme position of the auxiliary handle and a bottom surface of the base to a distance H1 between the upper extreme position of the window and the bottom surface of the base is greater than or equal to 1 and less than or equal to 2.5.

In an example, a ratio of an axial distance L2 between an inner end surface of the auxiliary handle facing towards the saw blade and the saw blade to an axial distance L1 between the window and the saw blade is greater than or equal to 2.

In an example, a distance L2 between an inner end surface of the auxiliary handle facing towards the saw blade and the saw blade is greater than a distance L5 between an end surface of the main handle facing towards the saw blade and the saw blade.

In an example, the main handle has a first central surface, the main handle is arranged substantially symmetrically about the first central surface, the auxiliary handle includes a holding portion and a connection portion, the connection portion connects the holding portion and the main handle, the connection portion has a second central surface, at least a portion of the connection portion is symmetrically about the second central surface, an axial distance L4 between the first central surface of the main handle and the saw blade is smaller than a distance L3 between the second central surface of the auxiliary handle and the saw blade.

In an example, a projection of the visible line in a plane perpendicular to the saw blade is defined as a first projection line, the auxiliary handle includes a nearest point closest to the first projection line, a projection of a straight line passing through the position of saw tip and the nearest point is defined as a second projection line, an angle between the first projection line and the second projection line is a visible angle b, and the visible angle b is greater than zero degrees.

In an example, the visible angle b is greater than or equal to 3 degrees and less than or equal to 10 degrees.

An electric circular saw includes: a base including a saw blade slot; a body including a casing and a drive mechanism disposed in the casing; a saw blade driven to rotate about a first axis by the drive mechanism, wherein the saw blade is disposed in the saw blade slot along a front-and-back direction; and a shield disposed on an outer circumference of the saw blade. The body includes a main handle and an auxiliary handle, the main handle has a first central surface, the main handle is arranged substantially symmetrically about the first central surface, the size of a part of the auxiliary handle located on the left side of the first central surface in the first axis is larger than the size of a part of the auxiliary handle located on the right side of the first central surface in the first axis.

In an example, the auxiliary handle includes a holding portion and a connection portion, the connection portion connects the holding portion and the main handle, the connection portion has a second central surface, at least a portion of the connection portion is symmetrically about the second central surface, an axial distance L4 between the first central surface of the main handle and the saw blade is smaller than a distance L3 between the second central surface of the auxiliary handle and the saw blade.

In an example, a distance L2 between an inner end surface of the auxiliary handle facing towards the saw blade and the saw blade is greater than a distance L5 between an end surface of the main handle facing towards the saw blade and the saw blade.

DETAILED DESCRIPTION

Figure 1:
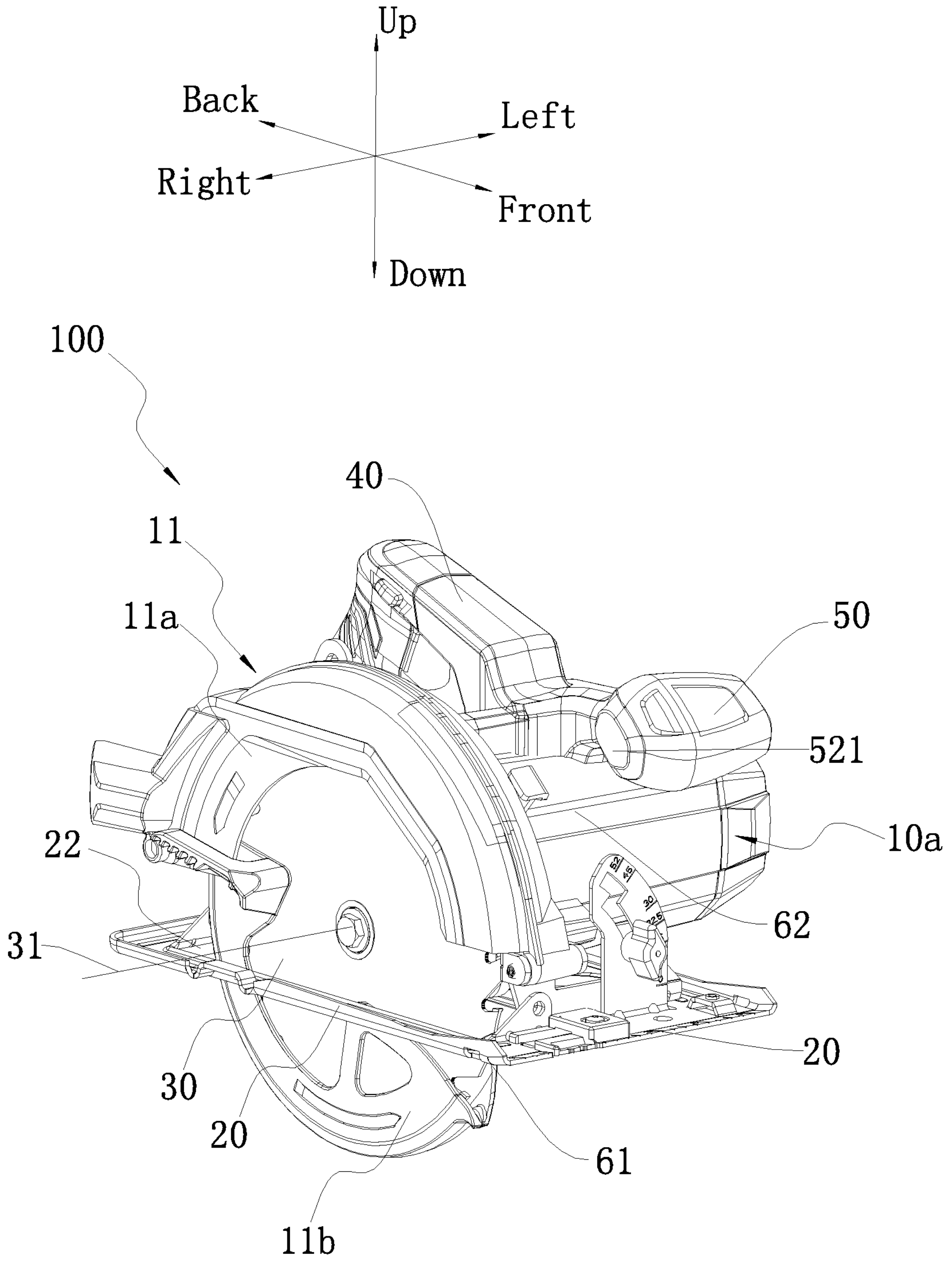
FIG. 1 is a perspective view of an electric circular saw according to an embodiment of the present disclosure.

As shown in FIGS. 1 to 4, an electric circular saw 100 includes a base 20, a body 10*a*, a saw blade 30, and a shield 11. The base 20 includes a saw blade slot 22. The body 10*a* includes a casing 10 and a drive mechanism 70 disposed in the casing 10. The saw blade 30 is driven to rotate about a first axis 101 by the drive mechanism 70, and the saw blade 30 is disposed in the saw blade slot 22 along the front-and-back direction. The shield 11 is disposed on an outer circumference of the saw blade 30 and connected to the body 10*a*, the shield 11 are connected to the base 20, and the shield 11 includes a fixed shield 11*a* connected to the casing 10 and a movable shield 11*b* capable of rotating relative to the fixed shield 11*a*.

Figure 5:
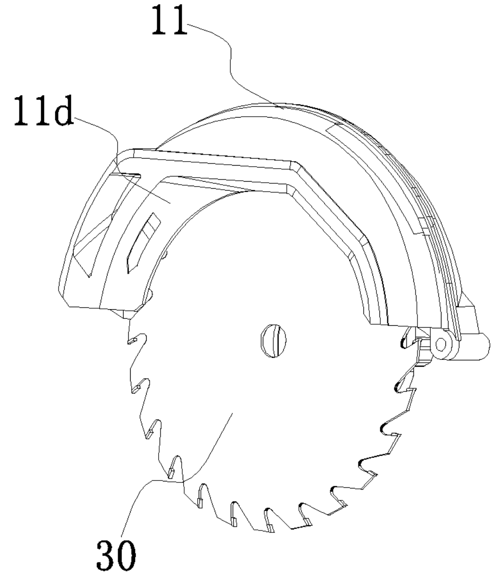
FIG. 5 is a perspective view of a saw blade and a fixed shied of the electric circular saw of FIG. 1.
Figure 6:
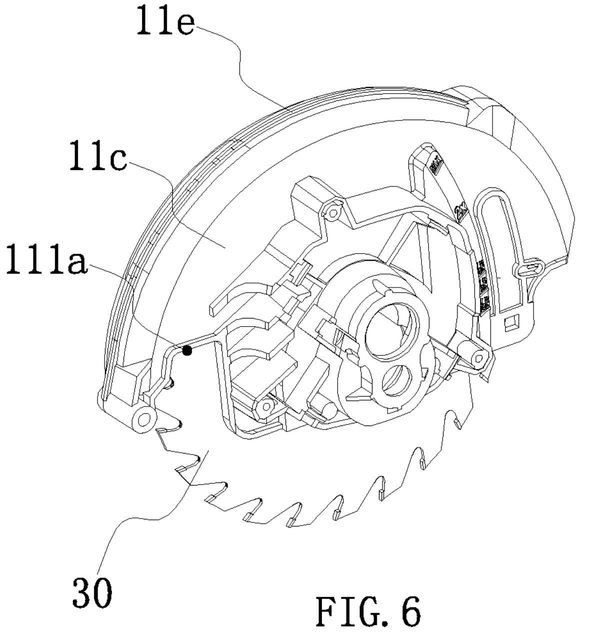
FIG. 6 is another perspective view of the saw blade and the fixed shied of the electric circular saw of FIG. 1.

As shown in FIGS. 5 to 6, the fixed shield 11*a* includes a first sidewall 11*c*, a second sidewall 11*d* and a connecting wall 11*e*, and the connecting wall 11*e* connects the first sidewall 11*c* and the second sidewall 11*d*. The first sidewall 11*c* is disposed on the left side of the saw blade 30. That is to say, the first sidewall 11*c* is disposed on the side of the saw blade 30 close to the drive mechanism 70. The second sidewall 11*d* is disposed on the right side of the saw blade 30. That is to say, the second sidewall 11*d* is disposed on the side of the saw blade 30 away from the drive mechanism 70. The first sidewall 11*c* is provided with a window 111 for a user's line of sight to view the saw blade 30. The casing 10 includes a main handle 40 and an auxiliary handle 50, and the auxiliary handle 50 is disposed on a front side of the main handle 40.

The saw blade 30 has a position of saw tip 61 located at a front end of the saw blade 30. The position of saw tip 61 at the front end of the saw blade 30 refers to a cutting point of the saw blade 30 on the product, that is, a position of the saw blade 30 that first contacts the product to be cut during cutting. In the process of cutting the product, as the saw blade 30 rotates, positions of saw blade teeth actually in contact with the product to be cut constantly change, but it is to be understood that the position of saw tip 61 is constant relative to the electric circular saw 100.

The window 111 has an upper extreme position 111*a* farther from the base 20 in an up-and-down direction. A straight line passes through the upper extreme position 111*a* of the window 111 and the position of saw tip 61 is defined as a visible line 63. The auxiliary handle 50 is configured to deviate from the visible line 63. That is to say, the visible line 63 does not pass through the auxiliary handle 50. Or, the auxiliary handle 50 is arranged not on the visible line 63. So, the auxiliary handle 50 will not block the user's line of sight to view the saw blade 30.

The auxiliary handle 50 is disposed on the lower side of the visible line 63. So, not only the auxiliary handle 50 will not block the user's line of sight to view the saw blade 30, but also the size of the electric circular saw 100 is small In the present disclosure, the auxiliary handle 50 is configured to deviate to the outer side from the visible line 63 so that the problem that the existing auxiliary handle blocks the line of sight can be solved and the user can easily observe the cutting position between the saw blade 30 and the product. In addition, the auxiliary handle 50 in this embodiment still maintains the original function of improving the operation comfort and stability of the operator.

In this embodiment, the window 111 is a rectangular window and the auxiliary handle 50 is configured to deviate to the outer side from a visible plane, where the visible plane refers to a plane passing through a top side of the window 111 and the position of saw tip 61, which is conducive to increasing a visible range of the operator. Of course, as an alternative embodiment, the window 111 is not limited to the rectangular window and may also be circular or in another shape, which is not limited.

Figure 3:
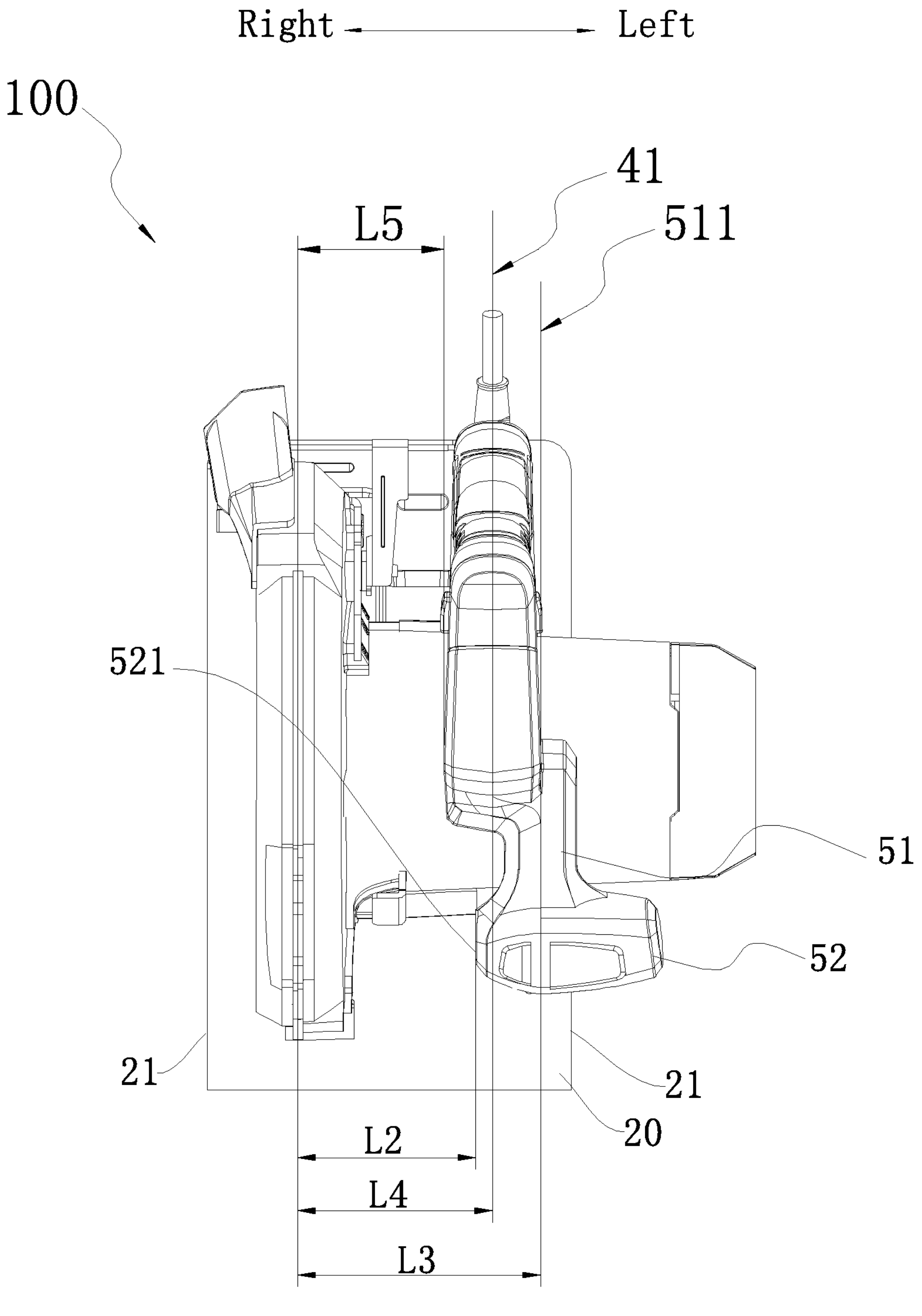
FIG. 3 is a top view of the electric circular saw of FIG. 1.

As shown in FIG. 3, a projection of the visible line 63 in a plane perpendicular to the saw blade 30 is defined as a first projection line. The auxiliary handle 50 includes a nearest point 50*a* closest to the first projection line. A projection of a straight line passing through the position of saw tip 61 and the nearest point 50*a* is defined as a second projection line 62. An angle between the first projection line and the second projection line 62 is a visible angle b, where the visible angle b in this embodiment is a positive angle of greater than zero degrees. The visible angle b is greater than or equal to 3 degrees and less than or equal to 10 degrees.

In this embodiment, the auxiliary handle 50 includes a connection portion 51 and a holding portion 52, the connection portion 51 extends perpendicular to the first axis 31 and connects the main handle 40 to the holding portion 52, and a center of the connection portion 51 forms a center of the auxiliary handle 50. Since the connection portion 51 connects the main handle 40 to the auxiliary handle 50, the connection portion 51 deviates from the saw blade 30 relative to a connection portion of the existing auxiliary handle so that the entire auxiliary handle 50 can deviate from the saw blade 30. In addition, the main handle 40 also extends along the front-and-back direction. The holding portion 52 extends parallel to the first axis 31 and is convenient for the operator to hold. Specifically, a front-and-back center plane of the connection portion 51 parallel to the saw blade is a front-and-back center plane of the auxiliary handle 50.

The main handle 40 has a first central surface 41, and the main handle 40 is arranged substantially symmetrically about the first central surface 41. The size of a part of the auxiliary handle 50 located on the left side of the first central surface 41 in the first axis is larger than the size of a part of the auxiliary handle 50 located on the right side of the first central surface 41 in the first axis. The connection portion 51 has a second central surface 511, at least a portion of the connection portion 51 is symmetrically about the second central surface 511, and the second central surface 511 does not coincide with the first central surface 41. The second central surface 511 is disposed on the left side of the first central surface 41, and a distance between the second central surface 511 and the first central surface 41 is greater than or equal to 10 mm and less than or equal to 40 mm. In the present example, the connection portion 51 is disposed on the left side of the first central surface 41.

It is to be understood that in an actual operation, the visible angle b may be acquired in a manner described below.

Figure 2:
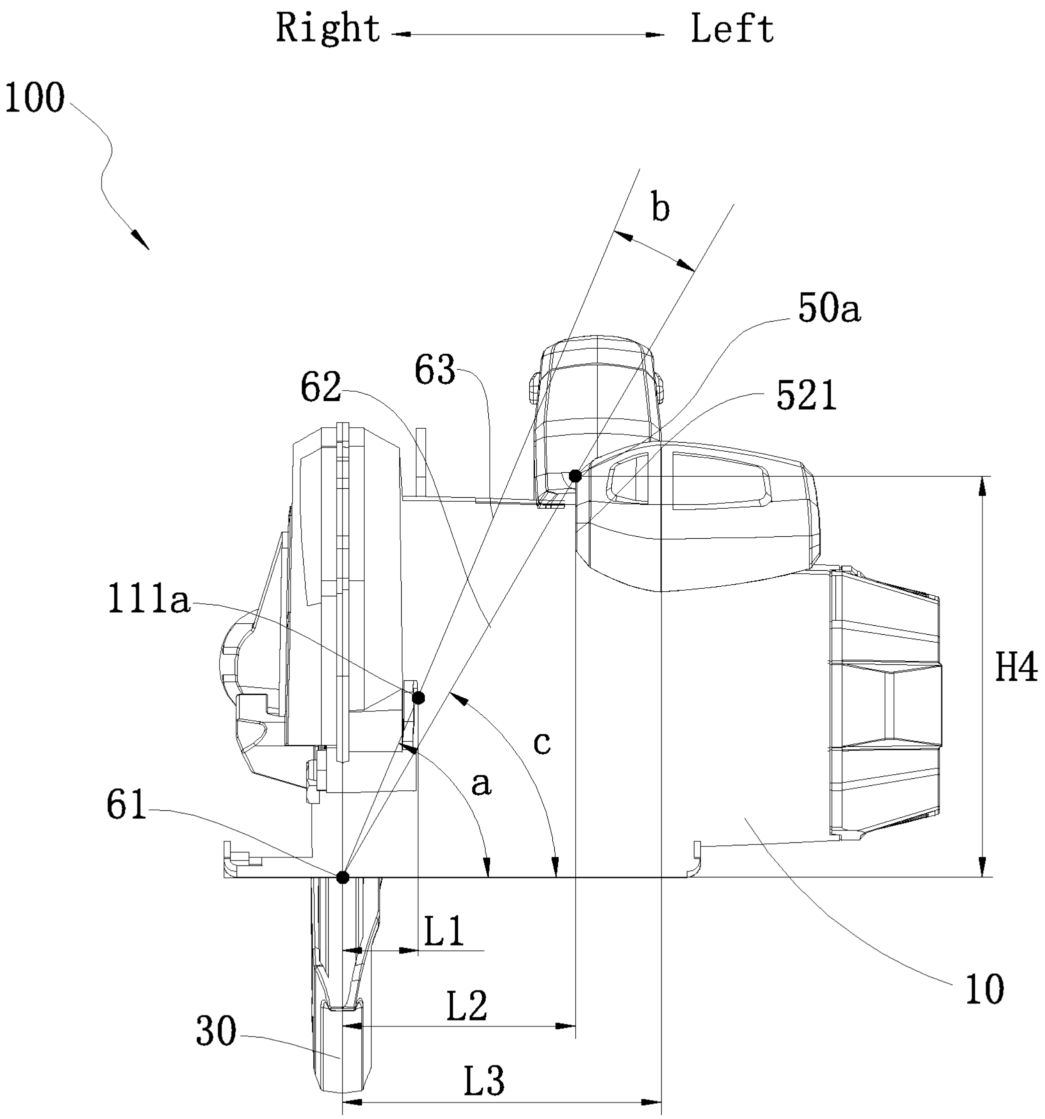
FIG. 2 is a front view of the electric circular saw of FIG. 1.

As shown in FIG. 2, an axial distance between an outer side surface of the window 111 and the saw blade 30 is L1, an axial distance between an end surface of the auxiliary handle 50 facing towards the saw blade 30 and the saw blade 30 is L2, a distance between the second central surface 511 of the auxiliary handle 50 and the saw blade 30 is L3, an axial distance between the first central surface 41 of the main handle 40 and the saw blade 30 is L4, and an axial distance between an end surface of the main handle 40 facing towards the saw blade and the saw blade is L5. In this embodiment, each of the auxiliary handle 50 and the main handle 40 is formed by assembling a pair of casings. Generally, a pair of casings is divided into two halves at a parting plane. In this embodiment, a parting plane of the auxiliary handle 50 forms the second center plane 511 of the auxiliary handle 50. In other words, in this embodiment, the auxiliary handle 50 is configured as halves with the second center plane 511 of the connection portion 51 as the parting plane, and a parting plane of the main handle forms the first center plane 41 of the main handle 40.

Of course, the parting planes of the auxiliary handle 50 and the main handle 40 may be non-planar. In this case, the second center plane 511 of the connection portion 51 parallel to the saw blade 30 may be regarded as the front-and-back center plane of the auxiliary handle 50.

Figure 4:
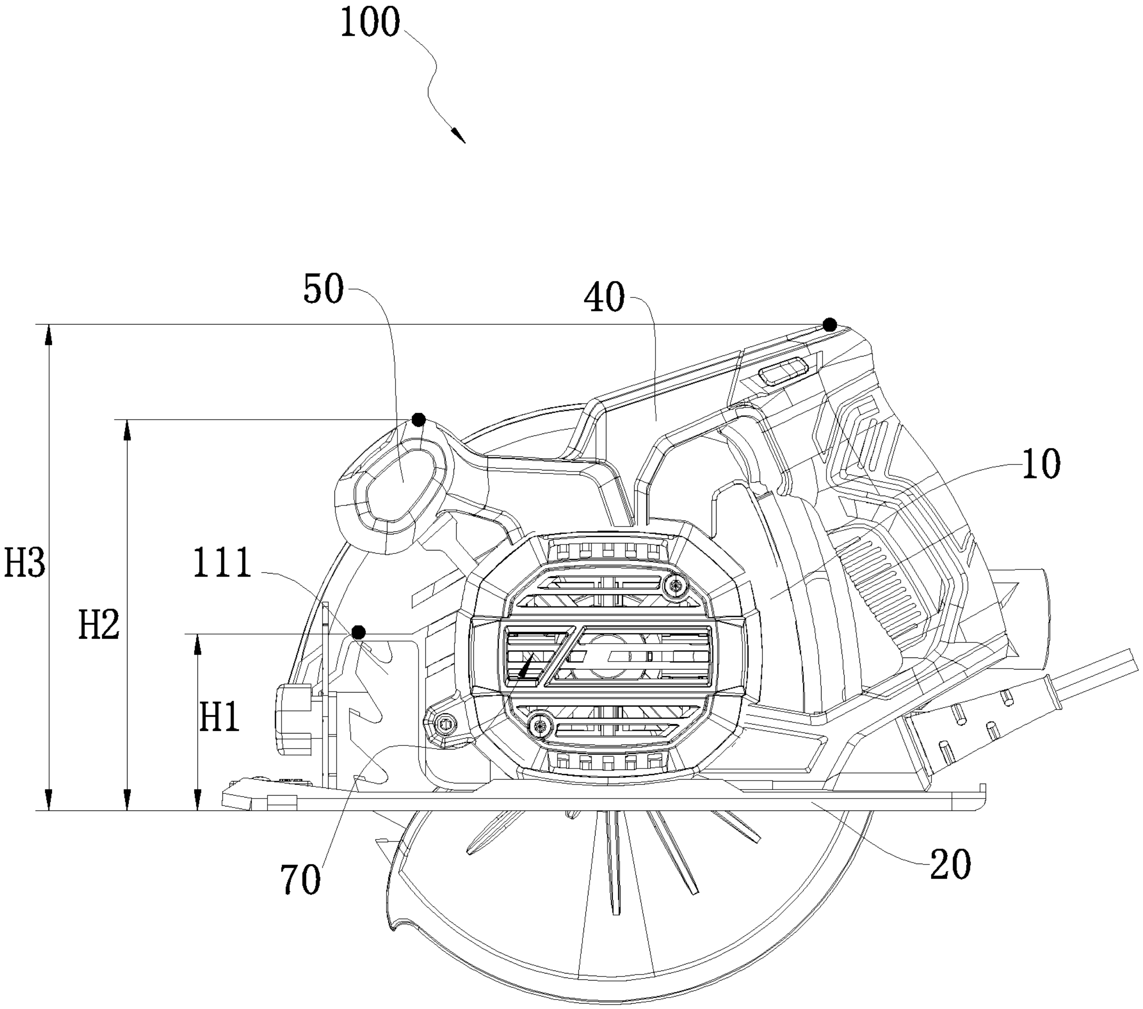
FIG. 4 is a right view of the electric circular saw of FIG. 1.

As shown in FIG. 4, a distance between the highest point of the window 111 and a bottom surface of the base 20 is H1, a distance between a highest point of the auxiliary handle 50 and the bottom surface of the base 20 is H2, and a distance between a highest point of the main handle 40 and the bottom surface of the base 20 is H3. The bottom surface of the base 20 refers to a surface in contact with a top surface of the product. Teeth at the front end of the saw blade 30 and closest to the bottom surface of the base 20 cut the product.

In the present disclose, all data and positional relationships are measured or explained on the basis that the base 20 is horizontal and the saw blade 30 has a maximum cutting depth.

As shown in FIG. 2, an angle between the second projection line 62 and the base 20 is an angle c, and an angle between the first projection line and the base 20 is an angle a. In this case, the base 20 refers to the base 20 in an original state, that is, a state where the base 20 is not turned over and is perpendicular to the saw blade 30. In conjunction with FIGS. 2 and 4, when the angle a is described as a=arctan $$\frac{H1}{L1}$$

and the angle c is described as c=arctan $$\frac{H4}{L2}$$

then, the visible angle b is described as b=a−c>0°.

In an example, the visible angle b in this embodiment is greater than 5 degrees. In this case, the operator can more easily observe a position of the cutting point.

In the electric circular saw 100 provided in this embodiment, the visible angle b is configured as the positive angle of greater than zero degrees so that the operator can easily observe the cutting position of the saw blade 30 in real time, and the following case can be avoided: the visible line 63 is blocked by the auxiliary handle 50 and the cutting accuracy and precision are affected.

In this embodiment, the nearest point 50*a* as an apex of the auxiliary handle 50 facing towards the saw blade 30 specifically refers to a highest point of an inner end surface 521 the end surface of the auxiliary handle 50 facing towards the saw blade 30. For ease of description, in this embodiment, the end surface of the auxiliary handle 50 facing towards the saw blade 30 is referred to as an inner end surface 521. Due to different body types of operators and different structures of auxiliary handles 50, an intersection between the line of sight of the operator looking at the saw tip 61 and the auxiliary handle 50 is not necessarily the highest point of the inner end surface 521 of the auxiliary handle 50.

In the first axis 31, the distance L3 between the second central surface 511 of the auxiliary handle 50 and the saw blade 30 is greater than the distance L4 between the first central surface 41 of the main handle 40 and the saw blade 30, that is, the auxiliary handle 50 deviates to an outer side relative to the main handle, which is conducive to improving the maneuverability of the electric circular saw for the operator.

Specifically, in this embodiment, the second central surface 511 of the auxiliary handle 50, a front-and-back center plane of the saw blade 30, and the first central surface 41 of the main handle 40 are parallel to each other.

FIG. 4 is a right view of the electric circular saw 100 according to the embodiment of the present disclosure. As shown in FIG. 4, in this embodiment, a relationship between H1, H2, and H3 is as follows $$1 \leq \frac{H2}{H1} \leq 2.5$$

so that the operator can more easily observe the cutting position between the saw blade 30 and the product while the auxiliary handle 50 provided in this embodiment has a good function of improving the operation comfort and stability of the operator. In one example, $$\frac{H3}{H2} \geq 1.$$

As shown in FIG. 3, the distance L2 between the inner end surface 521 of the auxiliary handle 50 facing towards the saw blade 30 and the saw blade 30 is greater than the axial distance L5 between the end surface of the main handle 40 facing towards the saw blade 30 and the saw blade 30. That is, the auxiliary handle 50 is configured to deviate to the outer side relative to the main handle 40. In this case, the auxiliary handle 50 provided in this embodiment not only can improve the visible range of the operator to observe the cutting point but also has the good function of improving the operation comfort and stability of the operator.

In this embodiment, the axial distance L5 between the end surface of the main handle 40 facing towards the saw blade 30 and the saw blade 30 is less than the axial distance L4 between the first central surface 41 of the main handle 40 and the saw blade 30. That is, L5<L4 so that the electric circular saw is conducive to further improving the visible range of the operator to observe the cutting point and has the good function of improving the operation comfort and stability of the operator. Specifically, the distance L4 between the first central surface 41 of the main handle 40 and the saw blade 30 is less than the distance L3 between the second central surface 511 of the auxiliary handle 50 and the saw blade 30.

In an example, L5<L2<L4 and L2<L4<L3 so that the electric circular saw is conducive to further improving the visible range of the operator to observe the cutting point and has the good function of improving the operation comfort and stability of the operator.

In an example, an orthographic projection of the second central surface 511 of the auxiliary handle 50 that extends along the front-and-back direction on the base 20 is located within the base 20 so that the following case can be prevented: when the operator operates the electric circular saw 100, the electric circular saw 100 turns outside since its center of gravity is instable due to a force applied by the operator. In this case, the auxiliary handle 50 provided in this embodiment deviates from the saw blade 30 relative to the existing auxiliary handle 50 to improve the visible range of the operator to observe the cutting point and its orthographic projection in the vertical direction can have a relatively large overlapping area with the base 20, which is conducive to reducing an area occupied by an outer contour of the electric circular saw 100 provided in this embodiment, making the electric circular saw 100 provided in this embodiment have a more compact structure, and improving the operation comfort and stability when the operator operates the electric circular saw 100.

As shown in FIG. 2, in this embodiment, L1, L2, and L3 satisfy the following relationship:

$$\frac{L2}{L1} \geq 2.$$

In an example, $$\frac{L3}{L2} \leq 2.5.$$

For example, $$\frac{L3}{L2}$$

is equal to 1.4 or 1.5 or 2, and $$\frac{L2}{L1}$$

is equal to 3. Specifically, $$\frac{L3}{L2} \leq 2.5$$

and $$\frac{L2}{L1} \geq 2.$$

Such a setting can further make the auxiliary handle 50 have the good function of improving the operation comfort and stability of the operator while improving the visible range of the operator to observe the cutting point.

The window 111 may be formed by a notch disposed on the shield 11, which is conducive to saving materials. In this embodiment, a shape of the window 111 may be roughly a rectangle or another irregular shape. In this embodiment, the window 111 may be directly formed during an injection molding process of the shield 11 or may be additionally machined and formed after the shield 11 is formed. Of course, the window may further include a window plate that is made of glass or a transparent material and disposed at the notch.

In this embodiment, a recessed connection region is formed between the main handle 40 and the auxiliary handle 50 so that it is convenient for the operator to hold the auxiliary handle 50. Specifically, as shown in FIG. 3, a connection surface between the connection portion 51 and the main handle 40 is recessed farther from the saw blade 30. As shown in FIG. 4, a connection surface between the connection portion 51 and the holding portion 52 forms a connection region recessed toward the base 20.

In this embodiment, the main handle 40 and the auxiliary handle 50 are integrally formed, which is conducive to simplifying a machining process and reducing assembly steps of the electric circular saw 100. For example, the main handle 40 and the auxiliary handle 50 may be integrally formed through injection molding.

Apparently, the preceding embodiments of the present disclosure are merely illustrative of the present disclosure and are not intended to limit embodiments of the present disclosure. Those of ordinary skill in the art can make various apparent modifications, adaptations, and substitutions without departing from the scope of the present disclosure. Implementations of the present disclosure cannot be and do not need to be all exhausted herein. Any modifications, equivalent substitutions, and improvements made within the spirit and principle of the present disclosure fall within the scope of the claims of the present disclosure.

What is claimed is:

1. An electric circular saw, comprising:

a base comprising a saw blade slot;

a body comprising a casing and a drive mechanism disposed in the casing;

a saw blade driven to rotate about a first axis by the drive mechanism, wherein the saw blade is disposed in the saw blade slot along a front-and-back direction; and a shield disposed on an outer circumference of the saw blade, wherein the shield comprises a fixed shield, the fixed shield comprises a first sidewall, a second sidewall and a connecting wall, the first sidewall disposed on the side of the saw blade close to the drive mechanism, the second sidewall is disposed on the side of the saw blade away from the drive mechanism, the connecting wall connects the first sidewall and the second sidewall, and the first sidewall is provided with a window for a user's line of sight to view the saw blade, wherein the body comprises a main handle and an auxiliary handle, the auxiliary handle is disposed on a front side of the main handle, the window has an upper extreme position farther from the base, and a cutting point of the saw blade on a product is defined as a position of saw tip, a straight line passes through the upper extreme position of the window and the position of saw tip is defined as a visible line, and the auxiliary handle is configured to deviate from the visible line, and wherein a distance L2 between an inner end surface of the auxiliary handle facing towards the saw blade and the saw blade is greater than a distance L5 between an end surface of the main handle facing towards the saw blade and the saw blade.

2. The electric circular saw of claim 1, wherein the auxiliary handle is disposed on the lower side of the visible line.

3. The electric circular saw of claim 1, wherein a ratio of a distance H2 between an upper extreme position of the auxiliary handle and a bottom surface of the base to a distance H1 between the upper extreme position of the window and the bottom surface of the base is greater than or equal to 1 and less than or equal to 2.5.

4. The electric circular saw of claim 1, wherein a ratio of an axial distance L2 between an inner end surface of the auxiliary handle facing towards the saw blade and the saw blade to an axial distance L1 between the window and the saw blade is greater than or equal to 2.

5. The electric circular saw of claim 1, wherein the main handle has a first central surface, the main handle is arranged substantially symmetrically about the first central surface, the auxiliary handle comprises a holding portion and a connection portion, the connection portion connects the holding portion and the main handle, the connection portion has a second central surface, at least a portion of the connection portion is symmetrically about the second central surface, an axial distance L4 between the first central surface of the main handle and the saw blade is smaller than a distance L3 between the second central surface of the auxiliary handle and the saw blade.

6. The electric circular saw of claim 1, wherein a projection of the visible line in a plane perpendicular to the saw blade is defined as a first projection line, the auxiliary handle comprises a nearest point closest to the first projection line, a projection of a straight line passing through the position of saw tip and the nearest point is defined as a second projection line, an angle between the first projection line and the second projection line is a visible angle b, and the visible angle b is greater than zero degrees.

7. The electric circular saw of claim 6, wherein the visible angle b is greater than or equal to 3 degrees and less than or equal to 10 degrees.

8. The electric circular saw of claim 6, wherein the visible angle b is greater than 5 degrees.

9. The electric circular saw of claim 1, wherein the main handle has a first central surface, the main handle is arranged substantially symmetrically about the first central surface, and the size of a part of the auxiliary handle located on the left side of the first central surface in the first axis is larger than the size of a part of the auxiliary handle located on the right side of the first central surface in the first axis.

10. An electric circular saw, comprising:

a base comprising a saw blade slot;

a body comprising a casing and a drive mechanism disposed in the casing;

a saw blade driven to rotate about a first axis by the drive mechanism, wherein the saw blade is disposed in the saw blade slot along a front-and-back direction; and a shield disposed on an outer circumference of the saw blade, wherein the shield comprises a fixed shield connected to the casing, the fixed shield comprises a first sidewall, a second sidewall and a connecting wall, the first sidewall disposed on the side of the saw blade close to the drive mechanism, the second sidewall is disposed on the side of the saw blade away from the drive mechanism, the connecting wall connects the first sidewall and the second sidewall, and the first sidewall is provided with a window for a user's line of sight to view the saw blade, wherein the body comprises a main handle and an auxiliary handle, the auxiliary handle is disposed on a front side of the main handle, the window has an upper extreme position farther from the base, and a cutting point of the saw blade on a product is defined as a position of saw tip, a straight line passes through the upper extreme position of the window and the position of saw tip is defined as a visible line, and the auxiliary handle is disposed on the lower side of the visible line, wherein a projection of the visible line in a plane perpendicular to the saw blade is defined as a first projection line, the auxiliary handle comprises a nearest point closest to the first projection line, a projection of a straight line passing through the position of saw tip and the nearest point is defined as a second projection line, an angle between the first projection line and the second projection line is a visible angle b, and the visible angle b is greater than zero degrees, and wherein the visible angle b is greater than or equal to 3 degrees and less than or equal to 10 degrees.

11. The electric circular saw of claim 10, wherein a ratio of a distance H2 between an upper extreme position of the auxiliary handle and a bottom surface of the base to a distance H1 between the upper extreme position of the window and the bottom surface of the base is greater than or equal to 1 and less than or equal to 2.5.

12. The electric circular saw of claim 10, wherein a ratio of an axial distance L2 between an inner end surface of the auxiliary handle facing towards the saw blade and the saw blade to an axial distance L1 between the window and the saw blade is greater than or equal to 2.

13. The electric circular saw of claim 10, wherein a distance L2 between an inner end surface of the auxiliary handle facing towards the saw blade and the saw blade is greater than a distance L5 between an end surface of the main handle facing towards the saw blade and the saw blade.

14. The electric circular saw of claim 10, wherein the main handle has a first central surface, the main handle is arranged substantially symmetrically about the first central surface, the auxiliary handle comprises a holding portion and a connection portion, the connection portion connects the holding portion and the main handle, the connection portion has a second central surface, at least a portion of the connection portion is symmetrically about the second central surface, an axial distance L4 between the first central surface of the main handle and the saw blade is smaller than a distance L3 between the second central surface of the auxiliary handle and the saw blade.

* * * * *